M. WEIWODA.
COMBINATION STRAINER AND SEPARATOR.
APPLICATION FILED MAR. 12, 1915.
1,251,601.
Patented Jan. 1, 1918.
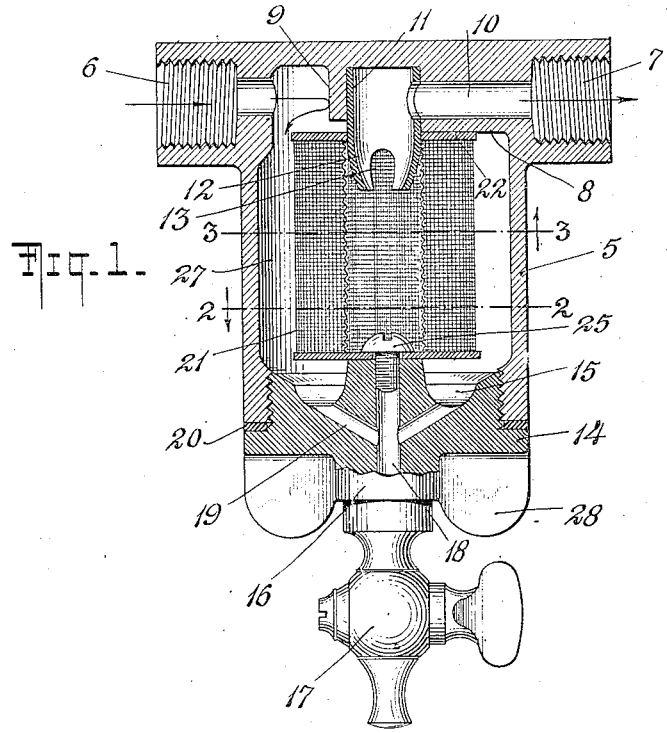
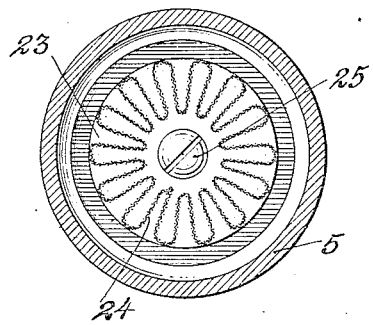
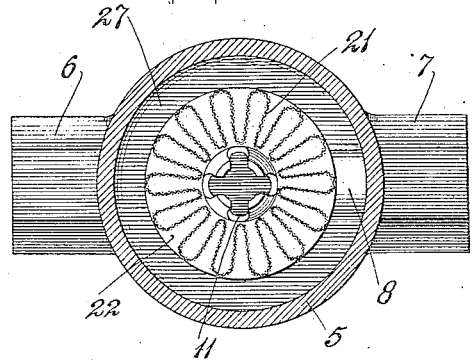
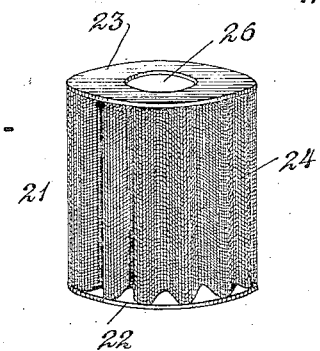
WITNESSES
George Du Bon
John A Kehlenbeck
INVENTOR
Mathias Weiwoda
BY
Briesen & Knauth
ATTORNEYS

UNITED STATES PATENT OFFICE.

MATHIAS WEIWODA, OF BROOKLYN, NEW YORK, ASSIGNOR TO FRIEDA LINA WEIWODA, OF BROOKLYN, NEW YORK.

COMBINATION STRAINER AND SEPARATOR.

1,251,601.     Specification of Letters Patent.     Patented Jan. 1, 1918.

Application filed March 12, 1915. Serial No. 13,992.

*To all whom it may concern:*

Be it known that I, MATHIAS WEIWODA, a citizen of the United States, and a resident of the borough of Brooklyn, county of Kings, city and State of New York, have invented a certain new and useful Improvement in Combination Strainers and Separators, of which the following is a specification.

My invention relates to combination strainers and separators more particularly of the kind used for liquid fuel before the same reaches a carbureter or equivalent device and has for its object to provide a straining surface of maximum area through which fuel will pass at relatively low speed, thus reducing agitation of the foreign matter after it has been removed from the fuel. Other objects of my invention will appear from the description hereinafter and the features of novelty will be pointed out in the appended claims.

In the accompanying drawings which illustrate an example of my improvement Figure 1 is a central longitudinal section of my improved strainer; Fig. 2 is a horizontal section on the line 2—2 of Fig. 1 looking downward; Fig. 3 is a similar view on the line 3—3 of Fig. 1 looking upward and Fig. 4 is a perspective view of the straining unit removed from the strainer.

As illustrated in the drawings the strainer comprises a shell or casing 5 of any suitable material provided at its upper portion with an inlet 6 and an outlet 7, the former being arranged for connection with a tank or other source of fuel supply and the latter being connected with the carbureter or other equivalent device. The upper end wall of the shell 5 is interiorly thickened as indicated at 8 to form a projection 9 in registry with the inlet 6, said thickened portion being provided with an outlet channel 10 communicating at one end with the outlet 7. The projection 9 forms a baffle for the fluid entering through the inlet 6 and causes the entering fluid to fall on the top of the strainer disposed below. At the other end said channel 10 connects with a tubular sleeve 11 detachably or otherwise fitted into a suitable recess in thickened portion 8 and extending in the direction of the axis of the shell 5 as clearly shown in Fig. 1. The said sleeve 11 projects below the portion 8 of the shell and terminates in a series of depending fingers 12 which preferably converge inwardly toward each other and form spaces 13 as is illustrated in Figs. 1 and 3. The lower end of the shell or casing 5 is internally screw-threaded to detachably receive a closure 14 formed with a trap 15 and provided with a depending neck 16 with which a drain cock 17 of any suitable type is arranged to be removably connected. A central axial passage 18 in said closure 14 communicates with said drain cock 17 and is connected with the trap 15 by means of one or a plurality of downwardly inclined channels 19 the inner ends of which are preferably located at the lower portion of the said trap 15 as indicated in Fig. 1. If desired a suitable washer or washers 20 may be located between said closure 14 and the end of the shell 5 to prevent leakage. The straining unit 21 comprises opposite end plates 22 and 23 between which the straining surface is fixed, said straining surface consisting of a sheet of perforated or foraminous metal or other material 24 extending back and forth in a substantially radial direction to form a multifold cylinder having a plurality of upright substantially radial surfaces connected together at their upright edges as is shown for instance in Fig. 2. The lower end plate 22 is provided with a central opening for the accommodation of a screw 25 which screws into the closure 14 and whereby said straining unit 21 is securely fastened upon the said closure. The upper end plate 23 is formed with an axial aperture 26 through which the tubular sleeve 11 and fingers 12 are arranged to project into the interior of said unit when the parts are in their assembled condition. An inspection of Fig. 1 will show that in this condition the spaces 13 between said fingers 12 are located below the said top end plate 23 or in other words entirely within the straining unit 21 the purpose of which will appear more fully from the description hereinafter. The sleeve 11 and fingers 12 may be replaced by any equivalent device adapted to extend through the axial aperture 26 into the interior of said unit 21 in the same way as does the sleeve 11 and fingers 12. The diameter of the straining unit 21 including the plates 22 and 23 is such that an annular space 27 is created between the foraminous material 24 and the shell 5 when the strainer is in operative condition, the said space 27 being in communication with the trap 15 as is illustrated in Fig. 1. If desired the closure 14 may be constructed with finger pieces or wings 28 whereby the connection and disconnection of said closure with and from the shell 5 is facilitated.

In operation the strainer is located between the source of fuel supply and the carbureter or equivalent device, the inlet 6 being connected with said source of fuel supply in any suitable manner and the outlet 7 being similarly connected with the carbureter or other equivalent device. The liquid fuel enters the shell 5 through the inlet 6 impacts against the projection 9 and is deflected on top of the straining unit 21. From here the fuel passes into the space 27 at a lower speed than at which it enters the shell and in a finer state of division spreads over the entire area of the foraminated fabric 24. The slow speed at which said fuel passes into the interior of the straining unit causes a positive and thorough separation of all dirt, sand, water or other foreign matter thereof this straining effect being still further increased by reason of the extremely large straining surface which is produced with my improved form of construction. The purified or clear fuel gradually rises in said straining unit and finally flows through the sleeve 11 channel 10 and outlet 7 to the carbureter or equivalent device. As the fuel gradually rises as described the air in the space 27 is gradually forced inward through the spaces 13 or their equivalents and thus out of the strainer, the air within the straining unit 21 being similarly forced out through the sleeve 11. This arrangement prevents the upper part of the straining unit 21 from becoming air bound and uneffective and renders every part of the fabric 24 effective for straining purposes. The foreign matter which is removed from the fuel by the straining unit is collected with the separated water in the trap 15 from which it may be drained off when desired by simply opening the drain cock 17. Any sediment or foreign matter collected in the trap 15 remains undisturbed due to the fact that the incoming fuel does not contact directly with its surface and furthermore because it has its speed reduced before it reaches the trap. The water accumulated in the trap further prevents the agitation of the settled impurities by the flowing fuel, which is lighter than water. Clogging of the material 24 is thus prevented and said material is not required to continually separate the same impurities from the fuel over and over again in addition to others which may enter with additional fuel, the consequence of this being that my improved strainer is at all times in a condition of maximum efficiency.

When it is desired to clean the strainer the unit 21, may be easily removed from the shell 5 by simply detaching the closure 14 therefrom, the unit 21 itself being easily removable from said closure when this is necessary for any reason by simply removing the screw 25. The sleeve 11 seals the outlet 7 against the interior of the shell 5 excepting by way of the straining unit thus preventing any unstrained fuel from passing through said outlet and also serves to maintain the upper end of said unit in its intended position.

Various changes in the specific construction shown and described may be made within the scope of the claims without departing from the spirit of my invention.

I claim:

1. A strainer for gasolene and the like comprising a casing having an inlet and an outlet at its upper end, and a trap at its lower end, a projection in said casing at the lower end thereof and provided with a drain passage and channels connecting said passage with said trap, a straining unit having its one end detachably secured to said projection and having an axial aperture at its other end, and a stationary depending tubular element extending through the axial aperture of the straining unit whereby the interior of the latter is connected with the outlet and whereby said unit is centered and its upper end is maintained in operative position.

2. A liquid strainer and separator comprising a casing having an inlet at its upper end and an outlet at the same end extending into the casing, a hollow straining unit spaced from the inner surface of said casing and extending downwardly from the inwardly-extending outlet, said strainer presenting a plate at the top thereof through which the outlet projects, a baffle for the inlet above the straining unit to direct the entering liquid on the top plate of the straining unit whereby the entering liquid is spread over the outer surface of the straining unit, and a trap in said casing below the straining unit.

3. A liquid strainer and separator comprising a casing having an inlet and an outlet at its upper end, a lower end plate in said casing, a tubular straining element secured to the end plate, and a tubular member from the outlet projecting into the tubular straining element and having therewith a sliding fit, said tubular member having a slot in the end thereof entering the straining unit to prevent any portion of said straining unit from becoming air bound.

4. A liquid strainer and separator comprising a casing having an inlet and an outlet at its upper end, both extending transversely of the major axis of said casing, a closure at the lower end of said casing presenting a central boss, an end plate secured to said boss, another end plate having a central aperture spaced from the first-mentioned plate, a foraminous fabric between said plates having radial folds and forming with said plates a tubular unit, and a tubular member extending from the outlet into the central aperture of the second-mentioned plate and having therewith a sliding fit, said tubular member having a slot in the portion thereof adapted to be below said second-mentioned plate whereby any portion of said tubular unit is prevented from becoming air bound.

5. A liquid strainer and separator comprising a casing having an inlet at its upper end and an outlet at the same end extending into the casing, a hollow straining unit spaced from the inner surface of said casing and extending downwardly from the inwardly-extending outlet, said strainer unit having a plate at the top through which the outlet projects, means for reducing the speed of the liquid coming from the inlet and for discharging the same on the top plate of the strainer, and a trap in said casing below the straining unit.

In testimony whereof I have hereunto set my hand in the presence of two subscribing witnesses.

MATHIAS WEIWODA.

Witnesses:
JOHN A. KEHLENTEEK,
FRED A. KLEIN.